United States Patent
Silbey et al.

(10) Patent No.: US 9,202,201 B2
(45) Date of Patent: Dec. 1, 2015

(54) APPROVAL BASED ECONOMY

(71) Applicants: Marc Silbey, Mercer Island, WA (US);
John Crocker, Valencia, CA (US);
Michael Vanloon, Kirkland, WA (US);
Lane Merrifield, Kelowna, CA (US);
Paul Cutsinger, Redmond, WA (US);
Christopher Heatherly, Monrovia, CA (US)

(72) Inventors: Marc Silbey, Mercer Island, WA (US);
John Crocker, Valencia, CA (US);
Michael Vanloon, Kirkland, WA (US);
Lane Merrifield, Kelowna, CA (US);
Paul Cutsinger, Redmond, WA (US);
Christopher Heatherly, Monrovia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 555 days.

(21) Appl. No.: 13/629,367

(22) Filed: Sep. 27, 2012

(65) Prior Publication Data
US 2014/0089405 A1    Mar. 27, 2014

Related U.S. Application Data

(60) Provisional application No. 61/655,906, filed on Jun. 5, 2012.

(51) Int. Cl.
*G06F 15/16* (2006.01)
*G06Q 10/10* (2012.01)
*G06Q 30/06* (2012.01)
*G06Q 50/00* (2012.01)
*H04N 21/45* (2011.01)
*H04N 21/478* (2011.01)

(52) U.S. Cl.
CPC ........... *G06Q 10/101* (2013.01); *G06Q 30/0631* (2013.01); *G06Q 50/01* (2013.01); *H04N 21/4532* (2013.01); *H04N 21/4781* (2013.01)

(58) Field of Classification Search
CPC .................................................. G06Q 30/0242
USPC ...................... 709/204; 705/26.1, 26.8, 14.11
See application file for complete search history.

(56) References Cited

U.S. PATENT DOCUMENTS 8,355,955 B1 * 1/2013 Mirchandani et al. ........ 705/26.1
2009/0299824 A1 * 12/2009 Barnes, Jr. ....................... 705/10

OTHER PUBLICATIONS

"What Elements of an Online Social Networking Profile Predict Target-Rater Agreement in Personality Impressions?"—Evans et al, Psychster, Mar. 2008 http://www.psychster.com/library/EvansGoslingCarroll_ICWSM08.pdf.*

* cited by examiner

*Primary Examiner* — Randy Scott
(74) *Attorney, Agent, or Firm* — Farjami & Farjami LLP

(57) ABSTRACT

There is provided a method and system for an approval based economy. The method comprises, receiving input corresponding to media content associated with a user, determining a number of approval units corresponding to the input, retrieving a user account associated with the user, and saving the approval units in the user account. The user account may include past approval units and an approval total. The approval total may account for the approval units and the past approval units, the approval units and the past approval units of active users and available media content only, or a maximum lifetime total of active users and available media content only. The approval based economy may provide new media content to users based on their respective approval total in their user account.

14 Claims, 4 Drawing Sheets

APPROVAL BASED ECONOMY

RELATED APPLICATIONS

This application claims priority to U.S. Provisional Application No. 61/655,906, filed on Jun. 5, 2012, which is hereby incorporated by reference in its entirety.

BACKGROUND

Online media content has changed the way people interact with each other. People are able to share photographs, play video games, and create user generated content that other user of an online environment may interact with. One example is that a user may share social messages with friends that the friends are allowed to approve, or "Like." The user may feel connected to their friends and a sense of pride when receiving these approvals. Furthermore, the user may access other online content, such as games or audiovisual content, which the user can further share. The user may reach a certain level in a video game and make the user's friends aware of this accomplishment. Thus, a user may feel rewarded for their work by sharing their success with an online world.

At present, when a user shares a piece of media content, the user can view the number of "Likes" the media content receives by viewing a number often included on or near the media content. However, the user may wish to delete the media content or remove it from public view. For example, the user may delete a video post to friends due to the age or content of the post, or the online environment may delete the post after a certain period of time. In another example, the user may restart a level or state in a video game. Furthermore, the online environment may remove other users, due to expired accounts or breaches the environment's terms of service. Thus, certain "Likes" of media content may either be deleted or no longer valid. Therefore, a "Like" approval to media content provides limited information about shared media content and the user.

SUMMARY

The present disclosure is directed to an approval based economy, substantially as shown in and/or described in connection with at least one of the figures, as set forth more completely in the claims.

DETAILED DESCRIPTION

Figure 1:
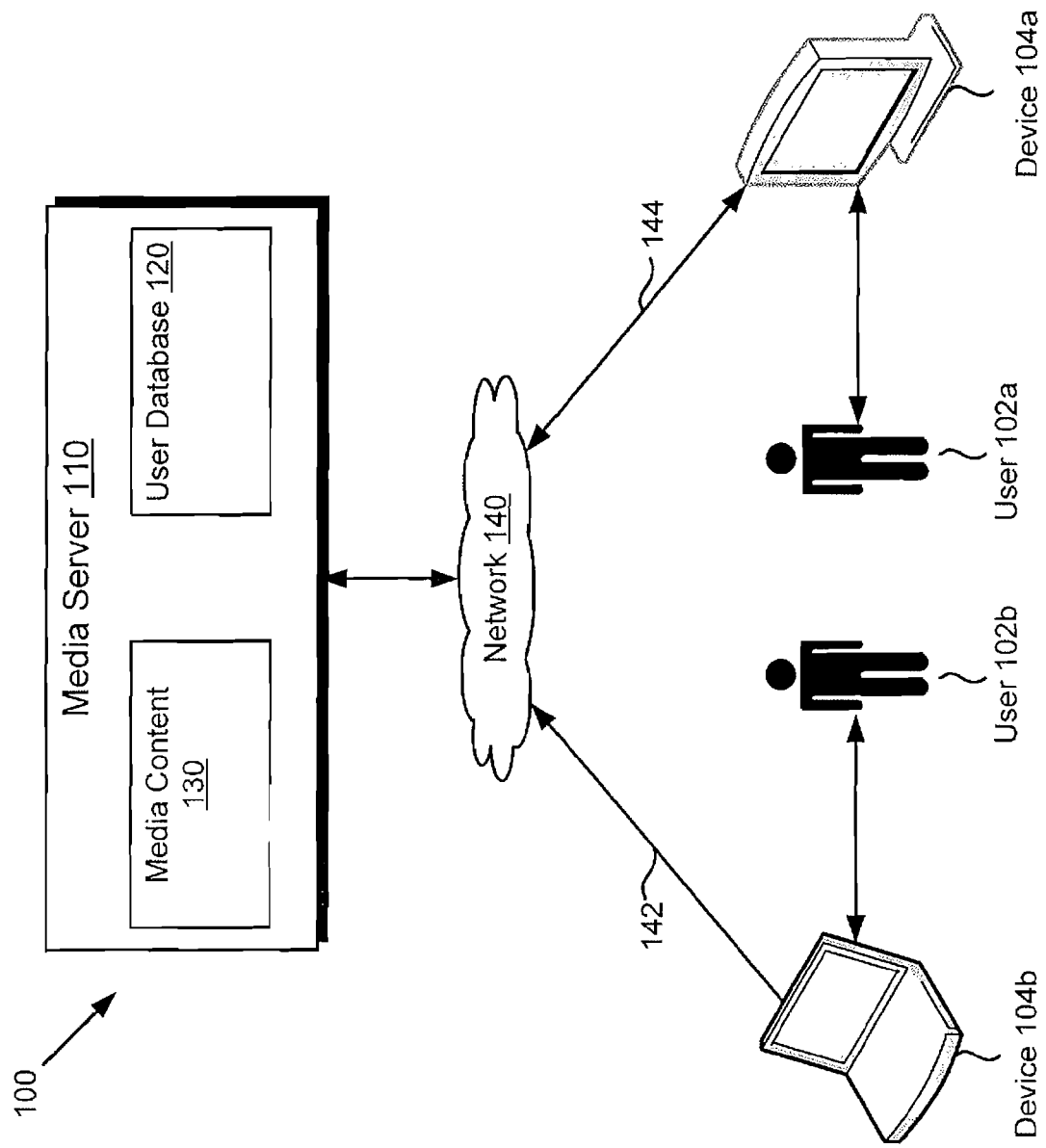
FIG. 1 presents a block diagram showing an exemplary system for an approval based economy.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

FIG. 1 shows a diagram of one exemplary implementation of a system for generating a highlight clip from a media content stream. As shown in FIG. 1, system environment 100 includes media server 110 including user database 120 and media content 130, which is accessible over network 140 by user 102a using device 104a and user 102b using device 104b. As further shown, user 102b may send approval 142, such as "Likes" or "Kudos," corresponding to media content of media server 110, while data 144 may correspond to communications between user 102a and media server 110, such transmission of user generated content, inputs related to an online interactive game, display of audiovisual content, or other interaction.

According to the implementation of FIG. 1, media server 110 may provide an approval based economy based on an interactive environment in media content 130. Conventional interactive environments that support the use and distribution of approvals are typically implemented as social networks or virtual communities that support approvals awarded by one community member to another. Conventional interactive environments may also be an interactive game, such as a video game, or a user generated content site, such as a location to upload user made videos. Approvals are credits allocated to users in the conventional interactive environment according to positive social engagement by the user. Credits, which may be in form of approval units denominated as "Likes" and/or "Kudos," for example, can be accumulated by a user and may be tracked and published in one or more of a number of ways. Although in FIG. 1, media content 130 is shown to reside on media server 110, it is understood that in separate implementations media content 130 may reside on a distinct network entity from media server 110.

Thus, user 102a may use device 104a to access media content 130 on media server 110. Device 104a may display media content 130, such as an interactive environment or video game. Then, data 144 may be communicated over network 140 between media server 110 and device 104a. This may allow user 102a to present user generated content, social interactions, audiovisual content, proficiency in a video game, or other online material, for consumption by user 102b. User 102b may represent another user of media content 130 or a group of users, such as the general public or a specific subset, given access to media content 130 on media server 110.

In one implementation, an approval based economy may track one or more of affirmative "Likes," "un-Likes," and "Dislikes," and may account for a user's accumulation of such approval 142 using a variety of accounting schemas based on the user generated content, social interaction, or other online material, for consumption by user 104b. Moreover, in implementations in which both "Likes" and "Dislikes" are accumulated, an approval based economy may track "Likes" and/or "un-Likes" using a positive account and "Dislikes" using a separate negative account. That is to say, in one implementation, a "Like" may correspond to incrementing a positive account by +1, an "un-Like," if used, may decrement a positive account balance by adding −1, and a "Dislike" may increment a negative account balance by −1. However, in the interests of conceptual clarity, the present description will focus on an approval based economy in which only affirmative "Likes" and/or other denominations of an affirmative approval currency are counted. One of ordinary skill in the art will recognize how the present system can be adapted to accommodate "un-Likes" and/or "Dislikes" as well as "Likes."

After tracking approval 142, media server 110 may store affirmative "Likes," "un-Likes," and "Dislikes," or an account balance in user database 120. Thus, user database 120 may store the approval 142 corresponding to media content 130 that user 102b is currently viewing. User database 120 may also store past approval of media content user 102a has previously uploaded or created as well. User database 120 may correspond to user 102a and reside on media server 110. User database 120 may also store additional user information, such as user account information, user history, user settings, and other information corresponding to user 102a. In one implementation, user database 120 may also store "Kudos" or credits earned or accumulated by user 102a through user 102a's online actions. Although in FIG. 1, user database 120 is shown to reside on media server 110, it is understood that in separate implementations, user database 120 may reside on a distinct network entity from media server 110.

Figure 2:
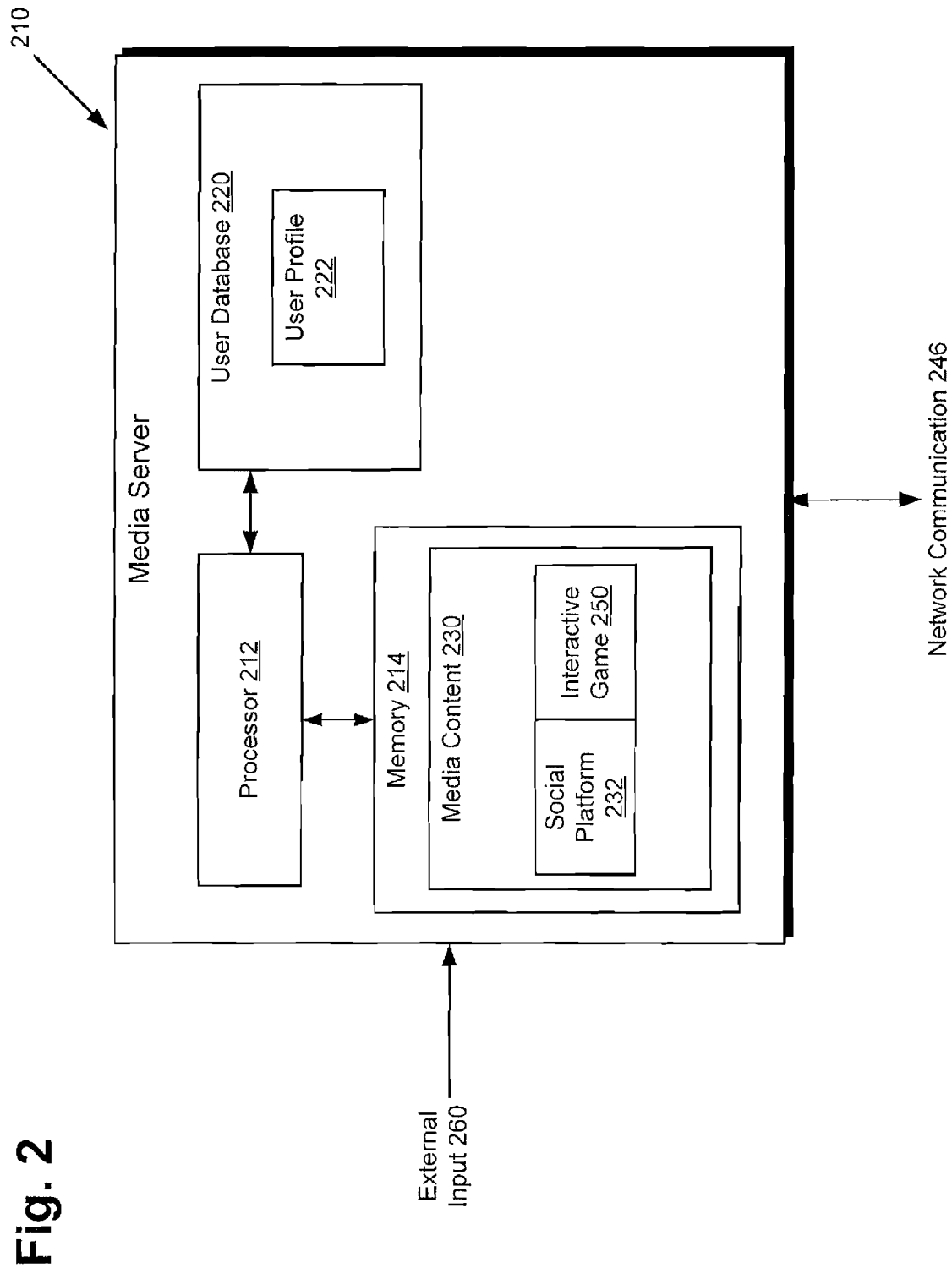
FIG. 2 shows a more detailed example of one implementation of a media server for use by a system using an approval based economy.

Turning now to FIG. 2, FIG. 2 provides a more detailed example of one implementation of a media server for use by a system using an approval based economy. As shown in FIG. 2, media server 210 may receive data over network communication 246 as well as external input 260. Media server may include processor 212 and memory 214 storing media content 230, such as social platform 232 and interactive games 250. Media server 210 may also include user database 220 including user profile 222.

In one implementation, as shown in FIG. 2, media server 210 may be in connection with users, such as users 102a and 102b of FIG. 1, using network communications 246. Media server 220 may also receive external input over a network, such as network 140 of FIG. 1. Thus, media server 220 may receive data from a variety of sources, such as network communication 246 and external input 260.

Media server 210 may utilize processor 212 to access media content 230 stored in memory 214. Processor 212 may be configured to run media content 230, such as social platform 232 or interactive games 250, to provide an interactive environment for use by an approval based economy. Thus, media server 210 may utilize processor 212 to provide media content 230 to users over network communications 246. Although it is shown that memory 214 stores media content 230 on media server 210 in FIG. 2, in other embodiments media content 230 may be located elsewhere, such as another media server or on a user's personal computer, mobile device, or other electronic device. In such an embodiment, media server may receive information corresponding to approvals of media content 230 over network communication 246.

Processor 212 may be further configured to utilize user database 220 and access user profile 222. User profile 222 may be provided for use with media content 230, such as social platform 232 or interactive game 250. As previously stated, user profile 222 may save approvals or approval units corresponding to a user, keep a total of approval units, store user profile information, or contain other user information pertinent to media content 230.

Media server 210 may also receive external input 260. This may be the case where a user, such as user 102a of FIG. 1, provides media content to an outside source, such as an external social networking website, that transmits the data to media server 210. Thus, media server 210 may be in communication with outside media content, such as social networks, user generated content sites, or other media content sources. For example, media server 210 may receive information of "Likes" or other approval units from FACEBOOK™, GOOGLE+™, MYSPACE™, TWITTER™, or YOUTUBE™.

Figure 3:
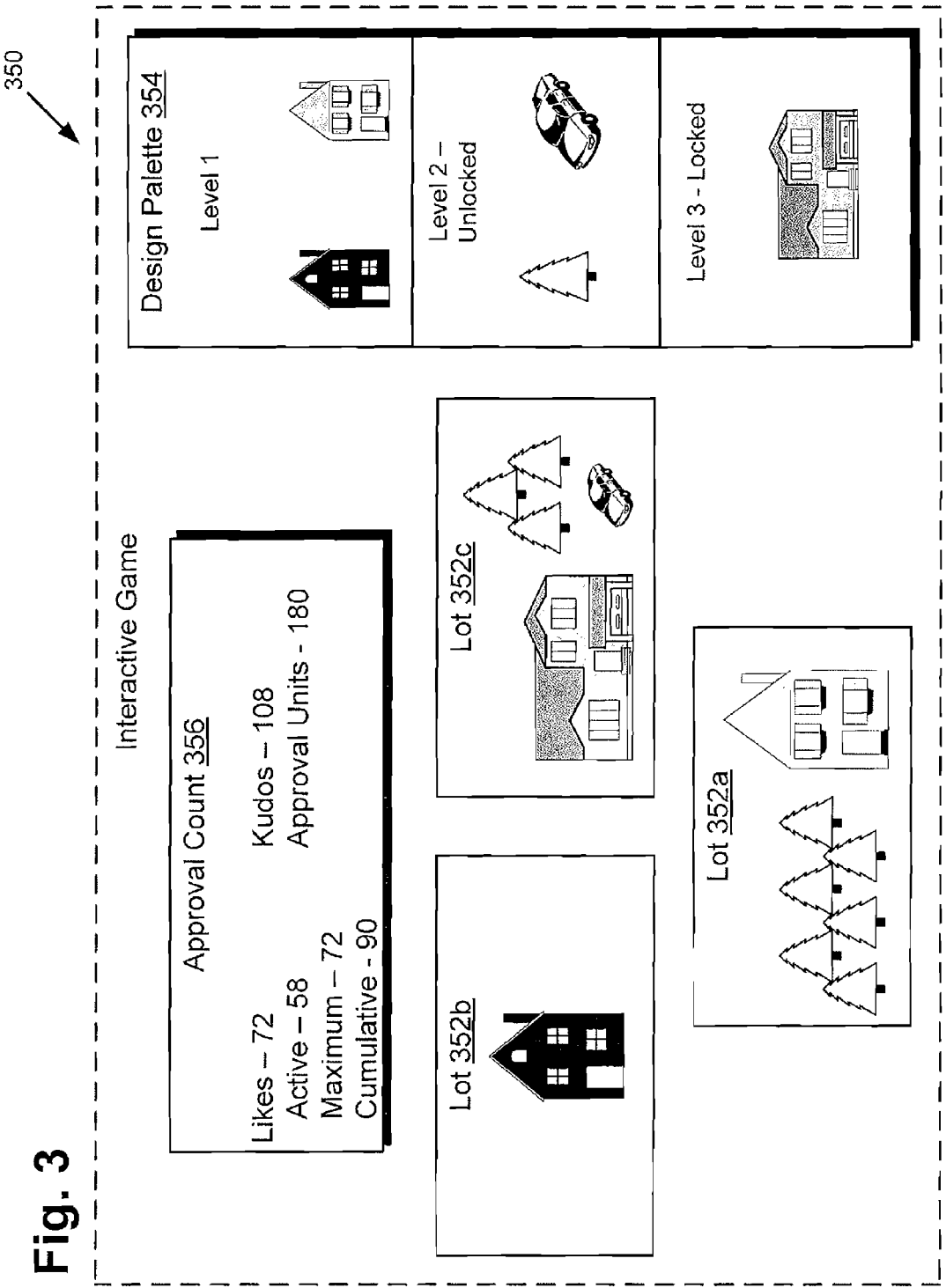
FIG. 3 presents an exemplary media content using an approval based economy in the form of an interactive game.

Referring now to FIG. 3, FIG. 3 presents an exemplary media content using an approval based economy. FIG. 3 shows interactive game 350, including lot 1 352a, lot 2 352b, and lot 3 352c, design palette 354, and approval count 356. Interactive game 350 may correspond to interactive game 250 of FIG. 2 and be accessible on media server 110/210. In other embodiments, interaction game 350 may exist on a separate media server from media server 110/210 or on a user's personal computer, mobile device, or other electronic device, and transmit information corresponding to approvals in interactive game 350. Thus, interactive game 350 may provide an interactive environment for a user to obtain "Likes" or approval units.

According to the present principles an approval based economy is designed to acknowledge and accommodate the reality that human actors, even when participating by proxy in a virtual community or environment, tend to create content that evolves over time. In one implementation, for example, a user in an interactive environment with an approval based economy may set out to produce a work of art or design, such as Lot 352a. That artwork or design could be published by the user at one or more stages of completion, such as in interactive game 350. Other users in the interactive environment would have the opportunity to express approval for the artwork or design at any or all stages of completion, as can be seen in approval count 356. In order to enable such an approval based economy to account for the accumulation of approval units such as "Likes" by a user, at least three distinct approval accounting schemas, including cumulative accounting, maximum accounting, and active accounting exist, as shown under approval count 356.

As disclosed in FIG. 3, interactive game 350 may contain lot 352b and lot 352c corresponding to other users of interactive game 350. Users may utilize design palette 354 to build a lot, such as lots 352a, 352b, and 352c. During construction of lot 352a, 352b, and 352c, or subsequent to publishing lot 352a, 352b, and 352c, the users of interactive game 350 may view each design and submit an approval or "Like" the design of another user's lot. This approval or "Like" may be assigned a specific amount of approval units. The approval units assigned to each lot may be shown in an approval count shown in interactive game 350. Approval count 356 may present a variety of information to users of the interactive environment based on a cumulative accounting, maximum accounting, and active accounting method.

Active accounting may dynamically adjust an approval count to reflect only the accumulated approval units awarded by active users in the approval based economy to active content. In such an accounting schema, for example, approval units awarded by inactive, suspended, or deleted users would not be counted, nor would approval units awarded by active users to content that has been deleted or withdrawn by the user producing it. Thus, active accounting provides a real-time measure corresponding in general to a user's present level of productivity and interactivity within the approval based economy. For example, in FIG. 3, the user of interactive game 350 can view 72 "Likes" to the content, however, only 58 are "Likes" from active users and based on currently available content. Thus, in interactive game 350, lot 352a by the user has received 58 active "Likes." Active accounting may be presented to the user in the interactive game as a count hidden from other users, as a global count viewable by all users or a certain subset of users of the interactive game, or hidden from the user of the interactive environment.

Maximum accounting provides an approval count corresponding to the highest active account balance ever achieved by a user. Thus, maximum account may account for the maximum total of approval units for active users or users in an interactive environment based on available media content. As a result, a comparison of a user's active account balance and maximum account balance can provide a measure of the user's present activity in the approval based economy relative to a past level. For example, in FIG. 3, the user of interactive game 350 can view 72 "Likes" to the content, which corresponds to 72 maximum "Likes." Thus, maximum accounting may be shown to the user as the "Likes" earned by Lot 352a, in order to show the maximum approval units Lot 352a has achieved. Again, and similar to active accounting, maximum accounting may be presented to the user in the interactive game as a count hidden from other users, as a global count viewable by all users or a certain subset of users of the interactive game, or hidden from the user of the interactive environment.

Cumulative accounting accounts for every approval unit received by a user, without regard to the present status of the source of the approval unit, or the present status of the content for which the approval unit was awarded. As a result, cumulative accounting results in an ever increasing count, and corresponds in general to the duration and productivity associated with a user's interaction with the approval based economy. For example, in FIG. 3, the user of interactive game 350 can view 72 "Likes" to the content, however, the content has earned 90 cumulative "Likes," which may correspond to lot 352a, past lots that may or may not be accessible, or approval units received from inactive users. Again, and similar to active accounting, maximum accounting may be presented to the user in the interactive game as a count hidden from other users, as a global count viewable by all users or a certain subset of users of the interactive game, or hidden from the user of the interactive environment.

As a specific example of the relationship between active, maximum, and cumulative accounting, let us assume a new user in the approval based economy who publishes a single item of content and receives 100 approval units in the form of "Likes" from other users. At that time, the active, maximum, and cumulative accounting schemas would all register 100 approval units identified with the user. If 10 of the other users having awarded one approval each to the content are deleted from the approval based economy, the active accounting schema will adjust the approval count to 90, while the maximum and cumulative counts remain at 100. If the content receives 5 additional "Likes" or approval units, the active count rises to 95, the maximum count remains unchanged at 100, and the cumulative count increases to 105. If the content subsequently receives an additional 10 "Likes" or approval units, both the active and maximum counts rise to 105, while the cumulative count increases to 115.

Active, maximum, and cumulative accounting can also be used as global accounting schemas for a user by counting all approval units awarded to the user for any and all activities engaged in through the approval based economy. For example, in FIG. 3, users of interactive game 350 may accumulate approval units by producing content and being awarded "Likes" by other users as described above. Furthermore, the users of interactive game 350 may receive Kudos and a "Game Balance" according to the user's participation in game events and social interactions. For example, the "Likes" awarded to a player in interactive game 350 may be counted specifically to interactive game 350, or may also be more generally associated with the user, through user profile 222 of FIG. 2, as global "Likes" in an approval based economy. In addition, the user may be awarded "Kudos" or credits for participation and/or proficiency in interactive game 350 or another interactive game. For example, if interactive game 350 contains a separate scoring system, users may be award "Kudos" for progression through the scoring system. "Kudos" may also be awarded for positive social interaction within interactive game 350, such as participating in "Liking" other users lots, or for external interactions connected with interactive game 350. For example, an approval based economy supporting the interactive game 350 in FIG. 3 could also be designed to recognize "Kudos" or other approval units awarded as a result of active participation with a theme park pirate ride or attraction. Attendance of a user in the approval based economy at the theme park, and/or activity engaged in by the user while at the theme park, such as riding a pirate ride, can result in the award of approval units within the approval based economy. Moreover, the "Likes" and "Kudos" can be converted to standardized approval units and combined to provide the total balance of the user's approval account and the user's global approval account across the approval based economy.

Accumulation of approval units by a user in an approval based economy can result in one or more rewards. In one implementation, an increase in a user's approval units above a threshold count can result in an increase in the user's status. An increase in the user's status may increase the number and/or value of the resources of the approval based economy available to the user. An increase in user status may unlock content and/or resources previously inaccessible by the user. Referring to FIG. 3, such an increase in status can be limited to the user status within the interactive game 350, within the approval based economy as a whole, or both. In interactive game 350, design palette 354 may contain levels of access based on the approval units. As seen in FIG. 3, user of interactive game 350 has unlocked level 2 and used the corresponding design attribute of level 2 in lot 352a. However, user who has designed lot may only have access to level 1 of design palette 354, while user who has designed lot 352c may have unlocked level 3 and, therefore, used design attributes of level 3. In other implementations, unlocking content may provide new media content, such as new interactive games or levels, or even real world benefits such as perks or benefits within an amusement park or attraction. Such special features may include enhanced guest services, reduced prices on theme park collectibles, and/or reduced ride wait times.

FIGS. 1, 2, and 3 will now be further described by reference to FIG. 4, which presents flowchart 400 describing an exemplary flowchart illustrating a method for use by an approval based economy. With respect to the method outlined in FIG. 4, it is noted that certain details and features have been left out of flowchart 400 in order not to obscure the discussion of the inventive features in the present application.

Figure 4:
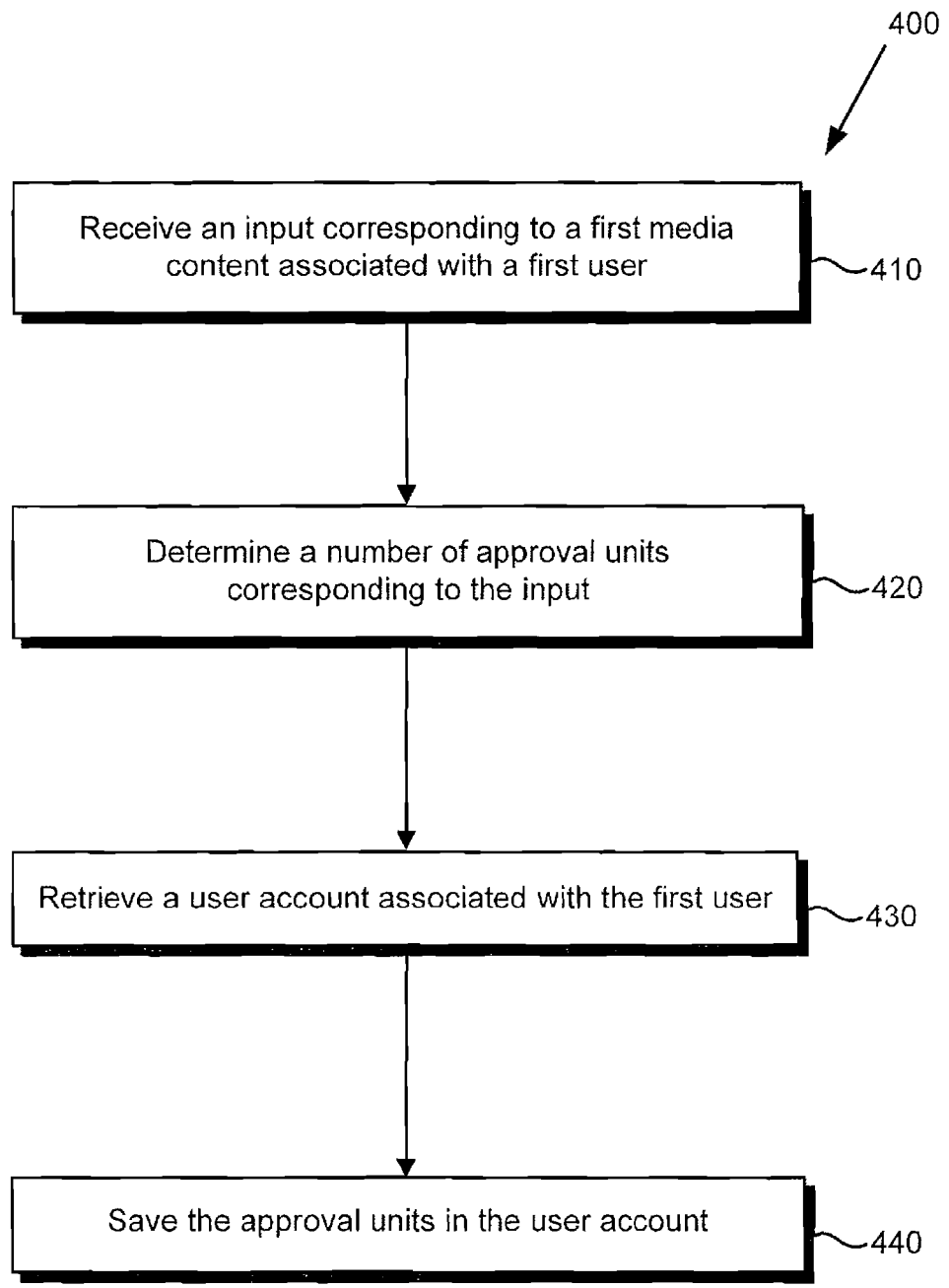
FIG. 4 presents an exemplary flowchart illustrating a method for use by an approval based economy.

Referring to FIG. 4 in combination with FIG. 1, FIG. 2, and FIG. 4, flowchart 400 begins with receiving an input corresponding to a first media content 130/230 associated with a first user 102a (410). The receiving may correspond to media server 110/210 receiving approval 142 over network 140 from device 104b of user 102b. For example, in one implementation, media server may receive a "Like" corresponding to approval 142 by user 102b utilizing device 104b. The "Like" may correspond to media content 130/230, such as social platform 232 and interactive game 250/350.

Media server 110/210 may also receive input from external input 260, such as from an external social media website or service. However, media server 110/210 may relate the input, such as an uploaded video or a social media message, to media content 230, including social platform 232 and interactive game 250/350. Thus, media server 110/210 may receive a different input, such as "Likes," "Kudos," or credits from external input 260.

Flowchart 400 continues by determining a number of approval units corresponding to the input (420). The determining may be performed by media server 110/210 utilizing processor 212 to access media content 130/230, such as social platform 232 and interactive game 250/350, to determine a number of approval units based on media content. For example, media server 110/210 may utilize processor 212 to access media content 130/230 and determine a social interaction in social platform 232 has received one "Like." Thus, social platform 232 may assign one approval unit to the input. Alternatively, media server 110/210 may receive an input related to interactive game 250/350, such as "Kudos" or credits. In such a case, interactive game 250/350 may assign the same or a different amount of approval units to the input depending on accounting and weighing schema.

The method of flowchart 400 continues by retrieving a user account 222 associated with the first user 102a (430). The retrieving may be performed by processor 212 of media server 110/210 accessing user database 120/220 to retrieve user profile 222. While it is shown that user database 120/220 including user profile 222 resides on media server 110/210, in other embodiments user database 120/220 may reside elsewhere, such as on another server accessible by media server 110/210.

In an exemplary embodiment, user 102a may be prompted for credentials before accessing user account 222 for security concerns. Thus, prior to accessing user database 120/220 to retrieve user profile 222, user 102a may be required to enter a user name and password, or complete security measures, such as questions. In another exemplary embodiment, user profile may be persistently associated with user 102a when user 102a accesses media server 110/210, such as by using web cookie technology.

In certain implementations, processor 212 of media server 110/210 may access user database 120/220 and determine a user account corresponding to user 102a does not exist. In such an implementation, media server 110/210 may prompt user 102a to create a user account before proceeding. Thus, after establishing a user account, such as user account 222, processor 212 of media server 110/210 may then access user account 222 associated with user 102a.

Flowchart 400 continues by saving the approval units in the user account 222 (440). The saving may correspond to processor 212 of media server 110/210 saving the approval units in user account 222. For example, if user 102a received one "Like," processor 212 of media server 110/210 may save the one "Like" as the amount of approval units previously determined in user account 222.

In one implementation, user account 222 may already have approval units saved. For example, in interactive game 250/350, approval count 356 shows approval units amounting to 180. As can be seen in approval count 356, user 102a has received 72 "Likes" for lot 352a, and 108 "Kudos." As previously discussed, "Kudos" can be earned as credits for other online interactions, such as "Liking" another users lot, such as lot 352b/352c, proficiency in a game, or interaction in a theme park or attraction associated with media server 110/210.

In this manner, an approval based economy may be created based on social interactions between users of a media content, such as an interactive environment. Thus, an online world may be created where users are encouraged to interact with each other in a positive manner.

Thus, the present application discloses an approval based economy. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a computer system having a processor and a memory, the method comprising:
   receiving an input corresponding to a first media content associated with a first user, wherein the input is from a second user;
   determining a number of approval units corresponding to the input;
   retrieving a user account associated with the first user;
   saving the approval units in the user account, wherein the user account includes past approval units corresponding to a second media content; and
   determining an approval total, the approval total corresponding to a maximum lifetime total of the approval units and the past approval units of active users.

2. The method of claim 1 further comprising determining an approval total, the approval total including the approval units and the past approval units.

3. The method of claim 1 further comprising determining an approval total, the approval total including the approval units and the past approval units of active users.

4. The method of claim 1 further comprising determining an approval total, the approval total including the approval units and the past approval units of available media content.

5. The method of claim 1 further comprising providing a new media content to the user based on the approval units in the user account.

6. The method of claim 1, wherein the user account further includes credits corresponding to actions taken by the user.

7. A media server accessible over a communication network, the media server comprising:
   a memory storing media content; and
   a processor configured to:
      receive an input corresponding to a first media content associated with a first user, wherein the input is from a second user;
      determine a number of approval units corresponding to the input;
      retrieve a user account associated with the first user;
      save the approval units in the user account, wherein the user account includes past approval units corresponding to a second media content; and
      determine an approval total, the approval total corresponding to a maximum lifetime total of the approval units and the cast approval units of active users.

8. The media server of claim 7, wherein the media content is further configured to determine an approval total, the approval total including the approval units and the past approval units.

9. The media server of claim 7, wherein the media content is further configured to determine an approval total, the approval total including the approval units and the past approval units of active users.

10. The media server of claim 7, wherein the media content is further configured to determine an approval total, the approval total including the approval units and the past approval units of available media content.

11. The media server of claim 7, wherein the media content is further configured to provide a new media content to the user based on the approval units in the user account.

12. The media server of claim 7, wherein the user account further includes credits corresponding to actions taken by the user.

13. A method for use by a computer system having a processor and a memory, the method comprising:
receiving a social interaction by a first user corresponding to at least one media content associated with a second user;
determining a number of approval units corresponding to the social interaction;
retrieving a user account associated with the second user;
saving the approval units in the user account; and
determining an approval score using the approval units and past approval units corresponding to the at least one media content, the approval score including a first approval total of the approval units and the past approval units, a second approval total of the approval units and the past approval units of active users, and a third approval total corresponding to the maximum lifetime total of the approval units and the past approval units of the active users.

14. The method of claim 13 further comprising providing new media content to the user based on the approval score.

* * * * *